United States Patent [19]

Dobitz

[11] Patent Number: 4,961,758
[45] Date of Patent: Oct. 9, 1990

[54] LIQUID MEMBRANE PROCESS FOR SEPARATING GASES

[75] Inventor: John K. Dobitz, Houston, Tex.
[73] Assignee: Texaco Inc., White Plains, N.Y.
[21] Appl. No.: 271,745
[22] Filed: Nov. 15, 1988
[51] Int. Cl.$^5$ ............................................. B01D 53/22
[52] U.S. Cl. .................................... 55/16; 55/20; 55/21; 55/68; 55/70; 55/71; 55/73; 585/818
[58] Field of Search ...................... 55/16, 68, 158, 20, 55/21, 70, 71, 73; 210/640; 585/818, 819

[56] References Cited

U.S. PATENT DOCUMENTS

| 3,244,763 | 4/1966 | Cahn | 55/16 X |
| 3,420,069 | 1/1969 | Booth | 55/16 X |
| 3,566,580 | 3/1971 | Li | 55/16 |
| 3,926,561 | 12/1975 | Lucero | 55/158 X |
| 4,239,506 | 12/1980 | Steigelmann et al. | 55/16 |
| 4,239,507 | 12/1980 | Benoit et al. | 55/158 X |
| 4,419,242 | 12/1983 | Cheng et al. | 55/16 X |
| 4,473,473 | 9/1984 | Cheng | 55/16 X |
| 4,504,285 | 3/1985 | Modisette | 55/16 |
| 4,583,996 | 4/1986 | Sakata et al. | 55/16 |
| 4,659,343 | 4/1987 | Kelly | 55/16 |

FOREIGN PATENT DOCUMENTS

| 54-102292 | 8/1979 | Japan | 55/158 |
| 60-099328 | 6/1985 | Japan | 55/158 |
| 60-147201 | 8/1985 | Japan | 55/158 |
| 62-033521 | 2/1987 | Japan | 55/158 |
| 63-051923 | 3/1988 | Japan | 55/158 |

OTHER PUBLICATIONS

WO 86/05706, 10/9/86, published PCT application to Ford.
John K. Dobitz, "Experiments In Hydrocarbon Gas Separation Using Liquid Hydrocarbon Membranes," presented at the AIChE Fall Meeting, New York, Nov. 15–18, 1987.
M. S. Brennan et al, "Natural Gas Separation Using Supported Liquid Membranes," AIChE Journal, vol. 32, No. 1, p. 558 (1986).

Primary Examiner—Robert Spitzer
Attorney, Agent, or Firm—Jack H. Park; Kenneth R. Priem; Harold J. Delhommer

[57] ABSTRACT

The invention is a liquid membrane process for separating a gaseous stream into a permeate stream of gases having predominantly lower equilibrium K values and a stream of gases having predominantly higher equilibrum K values, wherein the feed stream and the liquid membrane are operated at a temperature and pressure near a dew point of the feed stream in the two phase liquid/gas region of the phase envelope so that condensate from the feed stream will supply the liquid for the liquid membrane. The liquid membrane process is especially useful to separate hydrocarbon gases, such as a natural gas feed stream containing a large concentration of methane.

20 Claims, No Drawings

LIQUID MEMBRANE PROCESS FOR SEPARATING GASES

BACKGROUND OF THE INVENTION

This invention is a process for the separation of gases. More particularly, the instant invention concerns a liquid membrane process for separating gases.

Gas separation is a large portion of the cost of natural gas processing and of numerous enhanced oil recovery schemes. To begin with, ethane, propane, and higher homologues must be removed from natural gas to make a saleable methane product. The higher alkanes can then be used for many purposes. Other separations may be needed to further separate the higher alkanes.

Gas separation is also a large part of the cost of numerous enhanced oil recovery schemes. Miscible floods employing carbon dioxide or intermediate hydrocarbons usually require the separation and reinjection of produced miscible agent to be economical.

Most of the cost of gas processing is related to gas separation. Cryogenic separation requires expensive compression and refrigeration. Absorption processes require costly solvent reconditioning. Membrane technology is being investigated to avoid much of the energy intensive operations as well as reduce the amount of capital investment and operating costs.

Polymer membranes are being used commercially in many processes, the most famous being Monsanto's Prism process. Polymer membranes have the drawback that the mass flow through the membrane per unit area is very small. This means that the surface area of the system has to be very large. The Prism process uses bundles of small diameter tubes in the configuration of a heat exchanger with one end blocked off. This gives the separator a large surface area, but the unit still needs to be fairly large to achieve suitable flow rates.

Liquid membranes achieve much larger mass flow rates per unit area due to their higher permeabilities. Second, they may also have separating factors higher than polymer membranes. Third, polymer membranes have the disadvantage of preferential transport of lower molecular weight species, which for many separation processes comprise the majority of gas volume. On the other hand, liquid membranes preferentially transport gases having lower equilibrium K values, which for separations such as alkanes are the lower volume, heavier alkanes.

Most known liquid membranes have been aqueous solutions with a carrier complex as the active agent. In such a process, a compound goes through a reversible reaction at both the upstream and downstream sides of the membrane. Such membranes are poor for hydrocarbon transfer, but perform well with acid gases such as carbon dioxide or hydrogen sulfide.

The use of hydrocarbon liquid membranes to separate low molecular weight hydrocarbon gases has been disclosed in Brennan, M. S., Fane, A. G., Fell, C.J.D., "Natural Gas Separation Using Supported Liquid Membranes," AIChE Journal, Vol. 32, No. 1, p. 558 (1986); and Dobitz, John K., "Experiments In Hydrocarbon Gas Separation Using Liquid Hydrocarbon Membranes," presented at the American Institute of Chemical Engineers Fall Meeting, Nov. 15-18, 1987, New York.

SUMMARY OF THE INVENTION

The invention is a liquid membrane process for separating a gaseous stream into a permeate stream of gases having predominantly lower equilibrium K values and a stream of gases having predominantly higher equilibrium K values, which comprises flowing a gaseous feed stream into contact with a supported liquid membrane, drawing off a stream of gas having predominantly higher equilibrium K values from the upstream side of the liquid membrane which failed to permeate through the liquid membrane, and drawing off a permeate stream of gases having predominantly lower equilibrium K values which permeated through the liquid membrane.

The feed stream and the liquid membrane are operated at a temperature and pressure relatively near a dew point of the feed stream in the two phase liquid/gas region of the phase envelope so that condensate from the feed stream will supply the liquid for the liquid membrane. The liquid membrane process is especially useful to separate hydrocarbon gases, such as a natural gas feed stream containing a large concentration of methane.

DETAILED DESCRIPTION

The invention concerns a liquid membrane for the separation of gases, wherein the temperature and pressure of the gaseous feed stream to the liquid membrane is controlled relatively near the dew point of the feed stream so that condensate from the feed stream will supply the liquid for the liquid membrane. As the feed stream composition changes, the operating temperatures and pressures of the feed stream and liquid membrane are adjusted to keep the desired amount of condensate supplied to the membrane. Such a process solves the major problem of resupplying the liquid in a liquid membrane separation process.

Supported hydrocarbon liquid membranes have shown great promise in difficult gas separations, especially in the area of hydrocarbon gas separation. With a liquid membrane, the active selection is controlled by vapor liquid equilibrium (VLE). Mass transport is accomplished by diffusion. The concentration gradient required to drive the diffusion is supplied by the VLE at both the upstream and downstream surfaces of the liquid membrane. Thus, the separation depends on the composition of the feed and permeate streams, and operating temperatures and pressures.

A major difference between the VLE membranes and other membranes is that the components passing through the membrane can significantly alter the composition of the liquid forming the membrane. This change in composition will alter the VLE with a gas contacting both sides of the membrane and change the overall separation factors of the membrane system as components of the feed permeate through the membrane.

The active mechanism of transport through the membrane is believed to be Fickian diffusion. The concentration gradient is established by the VLE on either side of the membrane. The concentrations can be affected by pressure, temperature, composition of the gas in contact with the membrane, and the composition of the membrane itself. It is also believed that any bulk flows within the membrane are negligible. VLE of liquids are nonlinear with respect to pressure so the concentration gradient model must be used.

With the above assumptions, the molar flux of component i through the membrane is:

$$Q_i = \frac{AD_i}{t}(C_{i1} - C_{i2}),$$

where
Qi = molar flux of component i—moles/sec,
A = area of membrane surface—m²,
Di = diffusion coefficient of component i in concentration units associated with the support/liquid system—moles/sec/m/mole%,
$C_{i1}$ = liquid concentration of component i of the feed side,
$C_{i2}$ = liquid concentration of component i of the permeate side, and
t = thickness of the membrane with the support—m.

Surface component concentrations such as $C_{i1}$ and $C_{i2}$ in the membrane liquid can be calculated by the use of equilibrium K values, where $$K_i = y_i/x_i,$$

where
$x_i$ = liquid concentration of component i, and
$y_i$ = vapor concentration of component i.

A liquid membrane will preferentially transport gases having a lower equilibrium K value. Thus, for a natural gas stream of alkanes, most of the higher molecular weight alkanes from propane up will permeate through the hydrocarbon liquid membrane, and methane and a substantial percentage of ethane will fail to pass through the liquid membrane. However, there is not a direct correlation between higher equilibrium K values and lower molecular weight. For instance, at 100° F. and 100 psi, ethylene has an equilibrium K value of 0.7 and ethane has an equilibrium K value of 6.0. Thus, despite the lower molecular weight of ethylene, ethylene will quickly permeate through a hydrocarbon liquid membrane and ethane will remain on the upstream side of the liquid membrane.

Gaseous streams containing components with different equilibrium K values can be efficiently separated using the instant invention. Difficult separations such as the above-mentioned ethylene and ethane can be performed. Another difficult separation amenable to the present invention is butane and isobutane. These two alkanes have different equilibrium K values even though they have the same molecular weight. The separation of ammonia from other gases, such as nitrogen and hydrogen, the separation of methane and hydrogen, and the separation of halogen gases may also be performed by the instant liquid membrane invention.

To raise the operating temperature requirements and to make some separations easier, a compound may be added to the gaseous feed stream in an amount sufficient for the added compound to supply the condensate liquid for the liquid membrane. For instance, in a methane and hydrogen separation, a hydrocarbon having at least 4 carbon atoms should be added to the feed stream to supply the liquid membrane. One drawback is that it may be necessary to remove the added hydrocarbon later from the product streams. The ethane and ethylene example separation can be more efficiently performed by adding to the feed stream a hydrocarbon having at least 4 carbon atoms in an amount sufficient for the added hydrocarbon to supply the condensate liquid for the liquid membrane.

The feed stream and liquid membrane should be maintained at an operating pressure and temperature relatively near a dew point of the feed stream in the two phase liquid/gas region of the phase envelope so that the added compound will condense from the feed stream and supply the liquid for the liquid membrane. Some of the added compound will pass through the membrane and some will evaporate off the upstream side of the membrane. Consequently, sufficient added compound must be placed in the feed stream to replace the added compound lost from the liquid membrane and keep the liquid membrane intact to separate the feed stream into its two desired streams.

The liquid membrane process is especially useful for natural gas separation, wherein methane is separated from the heavier alkanes. Most natural gas comprises predominantly methane, and some ethane and heavier alkanes. The process is started by flowing the natural gas feed stream comprised predominantly of gases having a molecular weight less than decane into contact with the hydrocarbon liquid membrane on a support. The liquid membrane may be started by saturating the support with a hydrocarbon liquid having at least 6 carbon atoms. Once the liquid membrane is started, condensate from alkanes heavier than ethane will supply the liquid for the liquid membrane, depending upon the operating temperature and pressure.

Predominantly methane gas which failed to pass through the membrane may be drawn off from the upstream side of the liquid membrane. A permeate stream comprising gases having at least two carbon atoms may be drawn off from the downstream side of the liquid membrane. A small percentage of methane will pass through the membrane. This undesired methane may be removed by one or more additional passes of the permeate stream through another liquid membrane. In the same fashion, the heavier alkanes of the permeate stream may be separated into two or more streams by one or more separations involving a liquid membrane system.

The natural gas feed stream may also contain nitrogen, hydrogen sulfide, carbon dioxide, helium, or water. These compounds will preferentially stay on the upstream side of the membrane and fail to pass through the hydrocarbon liquid membrane in appreciable quantities.

At the beginning of the separation process, the liquid membrane may be started with the same compound or compounds which will provide the condensate liquid for the liquid membrane once the separation process is ongoing. It is also possible, and in some cases desirable, to start the liquid membrane with a compound which will not be supplied by the feed. At any rate, the component or components of the feed stream supplying a liquid condensate for the membrane will eventually replace the membrane starting material after a period of time.

For a natural gas separation process, it is preferred to start the liquid membrane with a more stable, less volatile compound which will insure that the liquid membrane lasts until the process reaches steady state. A membrane starting material such as crude oil will be a more stable, less volatile membrane starter than butane, pentane and hexane, which will probably comprise a large percentage of the membrane concentration after a natural gas separation process reaches steady state.

Saturating a support with the chosen liquid is all that is needed to construct a membrane. Of course, numerous liquid compounds may be used to start the membrane, provided that the membrane will last until the process reaches steady state and the feed stream supplies sufficient condensate to maintain and replenish the liquid membrane. For hydrocarbon separations, it is preferred to use a relatively heavy, nonvolatile hydrocarbon to start a liquid membrane. Because alkanes having about ten or less carbon atoms and kerosene evaporate rapidly, they are not as preferred a membrane starting material as oily type paraffins, or resinous, asphaltenic, paraffinic, or other nonvolatile hydrocarbons. For hydrocarbon separation, it is preferred to start the liquid membrane by saturating a support with a hydrocarbon liquid selected from the group consisting of kerosene, alkanes having at least 10 carbon atoms, petroleum jelly, oily type paraffins, and crude oil having high $C_7+$ fractions.

Some type of support is needed to help the liquid membrane maintain its integrity. Certain filter supports provide admirable structure to sustain the membrane. Although the best support may vary according to the separation process, it is generally preferred to have a support with a pore mesh size less than about 5000 angstroms. In some cases, a support having a pore mesh size less than about 50 angstroms may be best. Generally, a smaller pore size will provide a stronger and more stable membrane. A liquid membrane of smaller pore mesh size will tolerate a higher pressure differential since it would have a higher bubble point pressure.

In some situations, it may be desirable to use a sweep gas to aid in drawing the permeate stream of gases away from the downstream side of the membrane. A sweep gas such as helium might be used in low pressure laboratory separation, but is probably undesirable in commercial uses since the sweep gas would have to be separated out of the permeate product stream. An increased pressure differential would obviate the need for a sweep gas in large scale applications.

The following examples will further illustrate the novel liquid membrane of the present invention. These examples are given by way of illustration and not as limitations on the scope of the invention. Thus, it should be understood that the steps of the process and the composition of the membrane may be varied to achieve similar results in the scope of the invention.

EXAMPLES

Experimental data shows that petroleum gases can be separated with a hydrocarbon liquid membrane. These experiments were run in a stainless steel Millipore 90 mm filter holder. In place of the filter was a Millipore GVHP polymer (polyvinylidene difluoride) filter used as a support. The mesh size of this filter was about 2000 angstroms. This support was saturated with kerosene and placed in the filter holder wet. The feed gas consisted of a rich hydrocarbon stream simulated from a low gas/oil ratio producing oil field. The composition of the feed gas is listed in Table 1.

TABLE 1

| | |
|---|---|
| Methane | 30.07% |
| Ethane | 27.86 |
| Propane | 12.81 |
| i-Butane | 1.23 |
| n-Butane | 4.06 |
| i-Pentane | 0.84 |
| n-Pentane | 1.38 |
| Hexane | 0.91 |
| Nitrogen | 2.93 |

TABLE 1-continued

| | |
|---|---|
| Carbon Dioxide | 17.88 |

With an upstream pressure of 35 psia and a helium sweep gas on the downstream side of the membrane, the downstream concentrations were obtained. This separation was run thirteen times. The Table 2 and Table 3 figures are averages of those thirteen runs.

TABLE 2

| | |
|---|---|
| Methane | 0.67% |
| Ethane | 2.21 |
| Propane | 1.93 |
| i-Butane | 0.24 |
| n-Butane | 1.01 |
| i-Pentane | 0.27 |
| n-Pentane | 0.49 |
| Hexane | 0.43 |
| Nitrogen | 0.06 |
| Carbon Dioxide | 0.95 |
| Helium | Balance |

The above data gave the separation factors of Table 3.

TABLE 3

| | |
|---|---|
| Methane | 1.000 |
| Ethane | 3.89 |
| Propane | 8.22 |
| i-Butane | 11.39 |
| n-Butane | 16.02 |
| i-Pentane | 23.85 |
| n-Pentane | 28.74 |
| Hexane | 53.74 |
| Nitrogen | 1.00 |
| Carbon Dioxide | 2.52 |

All separation factors are relative to methane. In other words, a separation factor of 3.89 for ethane indicates that ethane passes through the liquid membrane 3.89 times as easily as methane. The separations were performed at room temperature under low pressure. Such a liquid membrane process allows for the separation of methane and nitrogen from other hydrocarbon gases without the use of refrigeration, resulting in substantial savings.

As previously stated, the active mechanism of transport through the liquid membrane is assumed to be Fickian diffusion. Since Fickian diffusion coefficients in liquids are highly insensitive to pressure, it was expected that the measured diffusion coefficients would be generally insensitive to pressure changes. Additional experiments proved this out. Diffusion coefficients and resulting membrane separation factors were generally nonresponsive to changes in operational pressure from about 160 kPa to 890 kPa.

Many other variations and modifications may be made in the concepts described by those skilled in the art without departing from the concepts of the present invention. Accordingly, it should be clearly understood that the concepts disclosed in the description are illustrative only and are not intended as limitations on the scope of the invention.

What is claimed is:

1. A liquid membrane process for separating a gaseous stream into a permeate stream of gases having predominantly lower equilibrium K values and a stream of gases having predominantly higher equilibrium K values, which comprises:

flowing a gaseous feed stream into contact with a supported liquid membrane, said liquid membrane having an upstream side in contact with the feed stream and an opposite downstream side, said feed stream and said liquid membrane being maintained at an operating pressure and temperature relatively near a dew point of the feed stream in the two phase liquid/gas region of the phase envelope so that condensate from the feed stream will supply the liquid for the liquid membrane;

drawing off a stream of gases having predominantly higher equilibrium K values from the upstream side of the liquid membrane which failed to permeate through the liquid membrane; and drawing off a permeate stream of gases having predominantly lower equilibrium K values from the downstream side of the liquid membrane which permeated through the liquid membrane.

2. The liquid membrane process of claim 1, wherein a gaseous feed stream is separated into a permeate stream comprising ammonia and a stream of other gases.

3. The liquid membrane process of claim 1, wherein a gaseous halogen feed stream is separated into two streams predominantly comprising different halogens.

4. The liquid membrane process of claim 1, further comprising adding a compound to the gaseous feed stream in an amount sufficient for said compound to supply the condensate liquid for the liquid membrane.

5. The liquid membrane process of claim 4, wherein methane and hydrogen are separated by adding to a feed stream of methane and hydrogen a hydrocarbon having at least 4 carbon atoms in an amount sufficient for said hydrocarbon to supply the condensate liquid for the liquid membrane.

6. A liquid membrane process for separating a gaseous hydrocarbon stream into a permeate stream of hydrocarbon gases having predominantly lower equilibrium K values and a stream of hydrocarbon gases having predominantly higher equilibrium K values, which comprises:

flowing a gaseous hydrocarbon feed stream into contact with a supported hydrocarbon liquid membrane, said liquid membrane having an upstream side in contact with the feed stream and an opposite downstream side, said feed stream and said liquid membrane being maintained at an operating pressure and temperature relatively near a dew point of the feed stream in the two phase liquid/gas region of the phase envelope so that condensate from the feed stream will supply the liquid for the liquid membrane;

drawing off a stream of hydrocarbon gases having predominantly higher equilibrium K values from the upstream side of the liquid membrane which failed to permeate through the liquid membrane; and drawing off a permeate stream of hydrocarbon gases having predominantly lower equilibrium K values from the downstream side of the liquid membrane which permeated through the liquid membrane.

7. The process of claim 6, further comprising starting the liquid membrane by saturating a support with a hydrocarbon liquid selected from the group consisting of kerosene, alkanes having at least 10 carbon atoms, petroleum jelly, oily type paraffins, and crude oil having high $C_{7+}$ fractions.

8. The process of claim 6, further comprising sweeping the permeate stream of hydrocarbon gases from the downstream side of the membrane with a sweep gas.

9. The process of claim 8, wherein the sweep gas is helium.

10. The process of claim 6, wherein the feed gas is comprised predominantly of hydrocarbon gases having a molecular weight less than decane.

11. The process of claim 10, wherein the permeate stream of hydrocarbon gases which permeates through the liquid membrane comprises gases having at least two carbon atoms.

12. The process of claim 6, further comprising adjusting the operating temperature and pressure of the feed stream and liquid membrane within the two phase liquid/gas region of the phase envelope to keep the desired amount of condensate on the upstream side of the liquid membrane as the feed stream composition changes.

13. The process of claim 6, wherein the liquid membrane is supported by a support having a mesh size less than about 5000 angstroms.

14. The process of claim 6, wherein the liquid membrane is supported by a support having a mesh size less than about 50 angstroms.

15. The process of claim 6, wherein a feed stream of ethane and ethylene is separated by adding to the feed stream a hydrocarbon having at least 4 carbon atoms in an amount sufficient for said hydrocarbon to supply the condensate liquid for the liquid membrane.

16. The process of claim 6, wherein the feed stream also comprises nitrogen.

17. The process of claim 6, wherein the feed stream also comprises hydrogen sulfide.

18. The process of claim 6, wherein the feed stream also comprises carbon dioxide.

19. The process of claim 6, wherein the feed stream also comprises water.

20. A liquid membrane process for separating a gaseous hydrocarbon stream into a stream comprising predominantly methane and a permeate stream of hydrocarbon gases comprising predominantly alkanes heavier than methane, which comprises:

flowing a gaseous feed stream into contact with a hydrocarbon liquid membrane on a support, said liquid membrane having an upstream side in contact with the feed stream and opposite downstream side, said liquid membrane started by saturating the support with a hydrocarbon liquid having at least 6 carbon atoms, said feed stream comprising methane and heavier alkanes, said feed stream and said liquid membrane being maintained at an operating pressure and temperature relatively near a dew point of the feed stream in the two phase liquid/gas region of the phase envelope so that condensate from the feed stream will supply the liquid for the liquid membrane;

drawing off predominantly methane gas from the upstream side of the liquid membrane which failed to pass through the membrane; and drawing off a permeate stream of alkanes heavier than methane from the downstream side of the liquid membrane which permeated through the liquid membrane.

* * * * *